United States Patent
Gomi et al.

(10) Patent No.: US 10,360,413 B2
(45) Date of Patent: Jul. 23, 2019

(54) PRINTED CIRCUIT BOARD AND CARD READER

(71) Applicant: NIDEC SANKYO CORPORATION, Suwa-gun, Nagano (JP)

(72) Inventors: Kazuhiro Gomi, Nagano (JP); Ikuro Kuribayashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 316 days.

(21) Appl. No.: 15/304,232

(22) PCT Filed: Apr. 9, 2015

(86) PCT No.: PCT/JP2015/061046
§ 371 (c)(1),
(2) Date: Oct. 14, 2016

(87) PCT Pub. No.: WO2015/159783
PCT Pub. Date: Oct. 22, 2015

(65) Prior Publication Data
US 2017/0132436 A1 May 11, 2017

(30) Foreign Application Priority Data
Apr. 14, 2014 (JP) .................................. 2014-082869

(51) Int. Cl.
*G06F 21/86* (2013.01)
*G06K 7/08* (2006.01)
(Continued)

(52) U.S. Cl.
CPC .............. *G06F 21/86* (2013.01); *G06K 7/00* (2013.01); *G06K 7/087* (2013.01);
(Continued)

(58) Field of Classification Search
CPC .......... G06F 21/86; G06K 7/00; G06K 7/087; G06K 7/10009; H05K 1/0275; H05K 1/0219; H05K 2201/09345
See application file for complete search history.

(56) References Cited

U.S. PATENT DOCUMENTS 5,719,750 A * 2/1998 Iwane .................. H05K 1/0216
174/255
6,340,797 B1 * 1/2002 Yoshida ................. H05K 1/112
174/260
(Continued)

FOREIGN PATENT DOCUMENTS

| JP | 2005136391 A | 5/2005 |
|---|---|---|
| JP | 2008545259 A | 12/2008 |
| JP | 2010287060 A | 12/2010 |

OTHER PUBLICATIONS

International Search Report corresponding to Application No. PCT/JP2015/061046; dated Jul. 14, 2015, with English translation.

*Primary Examiner* — Catherine Thiaw
(74) *Attorney, Agent, or Firm* — Cantor Colburn LLP (57) ABSTRACT

Provided is a printed circuit board having a breakdown detection pattern formed thereon for preventing illicit acquisition of sensitive data, the printed circuit board being configured so that false detection of a disconnection or a short in the breakdown detection pattern can be prevented. The printed circuit board comprises a breakdown detection pattern layer wherein a breakdown detection pattern is formed for detecting a disconnection and/or a shorting thereof, a first pattern layer disposed more to a Y1 direction side than the breakdown detection pattern layer, a second pattern layer disposed more to a Y2 direction side than the breakdown detection pattern layer, and signal pattern layers disposed more to the Y2 direction side than the second pattern layer. Formed in the first pattern layer are a ground-
(Continued)

ing pattern and a power source pattern covering the breakdown detection pattern from the Y1 direction side. Formed in the second pattern layer are a grounding pattern and a power source pattern covering the breakdown detection pattern from the Y2 direction side.

8 Claims, 2 Drawing Sheets

(51) Int. Cl.
  *G06K 7/10* (2006.01)
  *G06K 7/00* (2006.01)
  *H05K 1/02* (2006.01)

(52) U.S. Cl.
  CPC ....... *G06K 7/10009* (2013.01); *H05K 1/0275* (2013.01); *H05K 1/0219* (2013.01); *H05K 2201/09345* (2013.01)

(56) References Cited

U.S. PATENT DOCUMENTS

| | | | |
|---|---|---|---|
| 8,659,908 B2 * | 2/2014 | Adams | H01L 23/573 361/765 |
| 2002/0104669 A1 * | 8/2002 | Underwood | H05K 1/0218 174/358 |
| 2004/0120101 A1 * | 6/2004 | Cohen | H01L 23/576 361/654 |
| 2010/0123469 A1 | 5/2010 | Hyatt | |
| 2015/0244374 A1 * | 8/2015 | Hadley | H05K 1/0275 326/8 |

* cited by examiner

PRINTED CIRCUIT BOARD AND CARD READER

CROSS REFERENCE TO RELATED APPLICATIONS

This is the U.S. national stage of application No. PCT/JP2015/061046, filed on Apr. 9, 2015. Priority under 35 U.S.C. § 119(a) and 35 U.S.C. § 365(b) is claimed from Japanese Application No. 2014-082869, filed Apr. 14, 2014, the disclosure of which is incorporated herein by reference.

TECHNICAL FIELD

At least an embodiment of the present invention relates to a printed circuit board which is formed in a plate shape or a film shape. Further, at least an embodiment of the present invention relates to a card reader comprising the printed circuit board.

BACKGROUND

Conventionally, as a safety case in which an electronic component requiring security is accommodated, a safety case has been known which is capable of detecting illegal access to the safety case and preventing leakage of data held by the electronic component (see, for example, Patent Literature 1). The safety case described in Patent Literature 1 is structured of an upper wall part in a flat plate shape, a side wall part in a tube shape, and a lower wall part in a flat plate shape. The upper wall part and the lower wall part are structured of an outer wall layer, a breakage detection layer and a circuit board layer which are disposed from an outer side of the safety case in this order. The outer wall part is a layer exposed to an outer side of the safety case and is a circuit board on which an electronic component requiring no security is mounted. The circuit board layer is a circuit board on which an electronic component requiring security is mounted.

In the safety case described in Patent Literature 1, the breakage detection layer structuring the upper wall part and the lower wall part includes an insulating base member and wiring patterns formed on both faces of the base member. The wiring pattern is structured of a plurality of base units in a spiral shape each of which is formed so that one detection line and ground lines interposing the detection line from both sides are wound in a spiral shape and covers entire regions of both faces of the base member. In the safety case, when the upper wall part or the lower wall part is broken, the wiring pattern of the breakage detection layer is disconnected and the disconnection of the wiring pattern is detected. Further, in the safety case, a predetermined processing is executed when disconnection of the wiring pattern is detected and thereby data leakage held by the electronic component is prevented.

PATENT LITERATURE

[PTL 1] Japanese Patent Laid-Open No. 2010-287060

As described above, in the safety case described in Patent Literature 1, the wiring pattern formed in the breakage detection layer is structured of a plurality of base units in a spiral shape each of which is formed so that one detection line and ground lines interposing the detection line from both sides are wound in a spiral shape. Therefore, in the safety case, a length of the detection line becomes long and thus impedance of the wiring pattern is high. Accordingly, in the safety case, the wiring pattern is easily affected by noise from the outside and thus disconnection of the wiring pattern may be erroneously detected due to the influence of the noise from the outside.

SUMMARY

In view of the problem described above, at least an embodiment of the present invention provides a printed circuit board in which a breakage detection pattern for preventing data requiring security from being illegally acquired is formed, the printed circuit board being capable of preventing from erroneously detecting disconnection and a short circuit of the breakage detection pattern. Further, at least an embodiment of the present invention provides a card reader comprising the printed circuit board.

In order to attain the above, at least an embodiment of the present invention provides a printed circuit board which is formed in a plate shape or a film shape. When one side in a thickness direction of the printed circuit board is referred to as a first direction, and the other side in the thickness direction of the printed circuit board is referred to as a second direction, the printed circuit board includes a breakage detection pattern layer formed with a breakage detection pattern for detecting its own disconnection and/or its short circuit, a first pattern layer which is disposed on a first direction side with respect to the breakage detection pattern layer, a second pattern layer which is disposed on a second direction side with respect to the breakage detection pattern layer, a signal pattern layer which is disposed on the second direction side with respect to the second pattern layer. The first pattern layer is formed with a ground pattern which covers the breakage detection pattern from the first direction side or formed with a ground pattern and a power supply pattern which cover the breakage detection pattern from the first direction side, and the second pattern layer is formed with a ground pattern which covers the breakage detection pattern from the second direction side or formed with a ground pattern and a power supply pattern which cover the breakage detection pattern from the second direction side.

In the printed circuit board in accordance with at least an embodiment of the present invention, a breakage detection pattern layer is formed on the first direction side with respect to the signal pattern layer. Therefore, according to at least an embodiment of the present invention, a data signal requiring security is transmitted in the signal pattern layer and, when the printed circuit board is attached to a predetermined apparatus so that a surface on the first direction side of the printed circuit board is disposed on an outer side, even in a case that a signal pattern layer is to be accessed for illegally acquiring the data signal requiring security, the breakage detection pattern is broken. Further, in at least an embodiment of the present invention, predetermined processing is executed when breakage of the breakage detection pattern is detected and thus data requiring security are prevented from being illegally acquired.

Further, in the printed circuit board in at least an embodiment of the present invention, the first pattern layer is formed with a ground pattern which covers the breakage detection pattern from the first direction side or formed with a ground pattern and a power supply pattern which cover the breakage detection pattern from the first direction side, and the second pattern layer is formed with a ground pattern which covers the breakage detection pattern from the second direction side, or formed with a ground pattern and a power supply pattern which cover the breakage detection pattern from the second direction side. In other words, in at least an embodiment of the present invention, the breakage detection pattern is shielded by a ground pattern and/or a power supply pattern from both sides in a thickness direction of the printed circuit board. Therefore, according to at least an embodiment of the present invention, even when impedance of the breakage detection pattern is high, the breakage detection pattern is hard to be affected due to noise from the outside. Accordingly, in this embodiment, erroneous detection of disconnection and a short circuit of the breakage detection pattern can be prevented.

Further, in at least an embodiment of the present invention, the first pattern layer disposed on the first direction side with respect to the breakage detection pattern layer is formed with a ground pattern which covers the breakage detection pattern from the first direction side or formed with a ground pattern and a power supply pattern which cover the breakage detection pattern from the first direction side. Therefore, according to at least an embodiment of the present invention, the breakage detection pattern can be invisible from the first direction side of the printed circuit board (in other words, from an outer side of the printed circuit board). Accordingly, in at least an embodiment of the present invention, a criminal is hard to notice a breakage detection pattern formed in the printed circuit board.

In at least an embodiment of the present invention, it is preferable that the printed circuit board is formed with vias which are penetrated through at least the signal pattern layer, the first pattern layer structures a surface on the first direction side of the printed circuit board, and first direction ends of all the vias are disposed on the second direction side with respect to the first pattern layer. According to this structure, even when a via penetrating through the signal pattern layer is formed in the printed circuit board, a criminal cannot directly access the via from the first direction side of the printed circuit board. Therefore, when the printed circuit board is attached to a predetermined apparatus so that a surface on the first direction side of the printed circuit board is disposed on an outer side, data requiring security are effectively prevented from being illegally acquired.

In at least an embodiment of the present invention, it is preferable that the printed circuit board is formed with arrangement holes, in which a part of an electronic component mounted on a surface on the second direction side of the printed circuit board is disposed, so as to penetrate through at least the signal pattern layer, and the first pattern layer structures a surface on the first direction side of the printed circuit board, and first direction ends of all the arrangement holes are disposed on the second direction side with respect to the first pattern layer. According to this structure, even when an arrangement hole where a part of an electronic component is disposed is formed in the printed circuit board, a criminal cannot directly access the arrangement hole from the first direction side of the printed circuit board. Therefore, when the printed circuit board is attached to a predetermined apparatus so that a surface on the first direction side of the printed circuit board is disposed on an outer side, data requiring security are effectively prevented from being illegally acquired.

In at least an embodiment of the present invention, it is preferable that the signal pattern layer structures a surface on the second direction side of the printed circuit board, the signal pattern layer is formed with a first signal pattern, a second signal pattern and a third signal pattern, the third signal pattern is formed so as to pass through between the first signal pattern and the second signal pattern and is insulated from the first signal pattern and the second signal pattern, and the first signal pattern and the second signal pattern are electrically connected with each other through a resistor mounted on a surface on the second direction side of the printed circuit board. According to this structure, the number of the vias formed in the printed circuit board can be reduced. Therefore, data requiring security are effectively prevented from being illegally acquired.

The printed circuit board in accordance with at least an embodiment of the present invention can be used in a card reader including a card reader main body to which the printed circuit board is attached, and a cover member which covers the printed circuit board. In the card reader, the signal pattern layer is formed with a signal pattern for transmitting a data signal which is read from a card in the card reader main body and/or a data signal which is recorded to a card in the card reader main body, and the printed circuit board is attached to the card reader main body so that a surface on the first direction side of the printed circuit board faces the cover member side and that a surface on the second direction side of the printed circuit board faces the card reader main body side.

In the card reader, in a state that the printed circuit board is attached to the card reader main body, when the signal pattern layer is to be accessed for illegally acquiring a data signal read from a card in the card reader main body and/or a data signal to be written to a card in the card reader main body, the breakage detection pattern is broken. Therefore, data requiring security are prevented from being illegally acquired by executing predetermined processing when breakage of the breakage detection pattern is detected. Further, in card reader, even when impedance of the breakage detection pattern is high, the breakage detection pattern is hard to be affected due to noise from the outside and thus erroneous detection of disconnection and a short circuit of the breakage detection pattern can be prevented.

As described above, in at least an embodiment of the present invention, data requiring security are prevented from being illegally acquired by using the breakage detection pattern. Further, according to at least an embodiment of the present invention, erroneous detection of disconnection and a short circuit of the breakage detection pattern can be prevented.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.

(Entire Structure of Card Reader)

Figure 1:
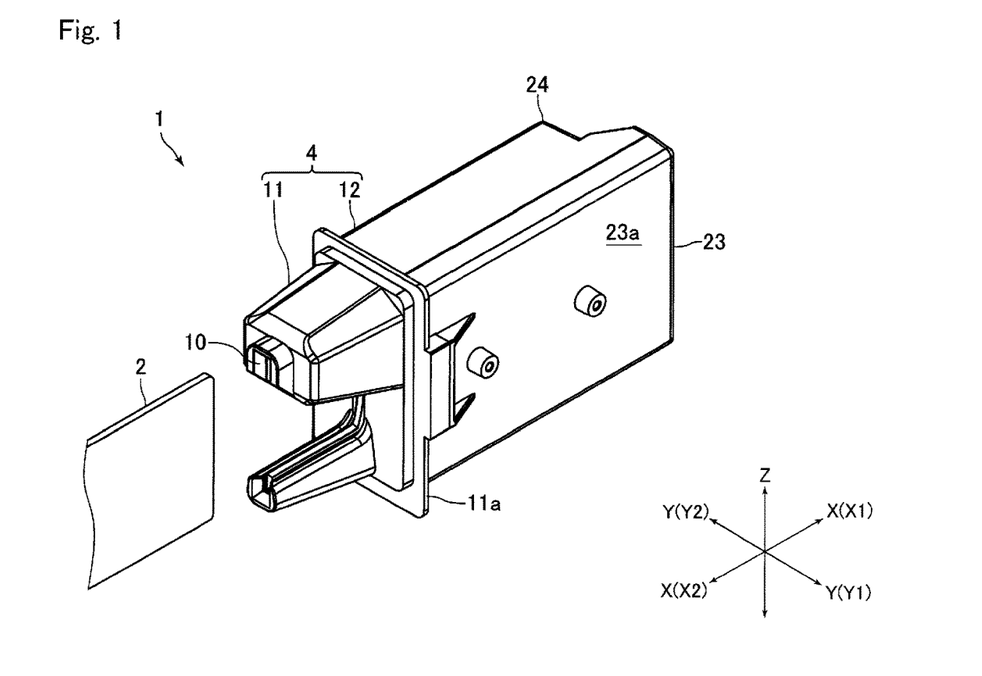
FIG. 1 is a perspective view showing a card reader in accordance with an embodiment of the present invention.

FIG. 1 is a perspective view showing a card reader 1 in accordance with an embodiment of the present invention.

Figure 2:
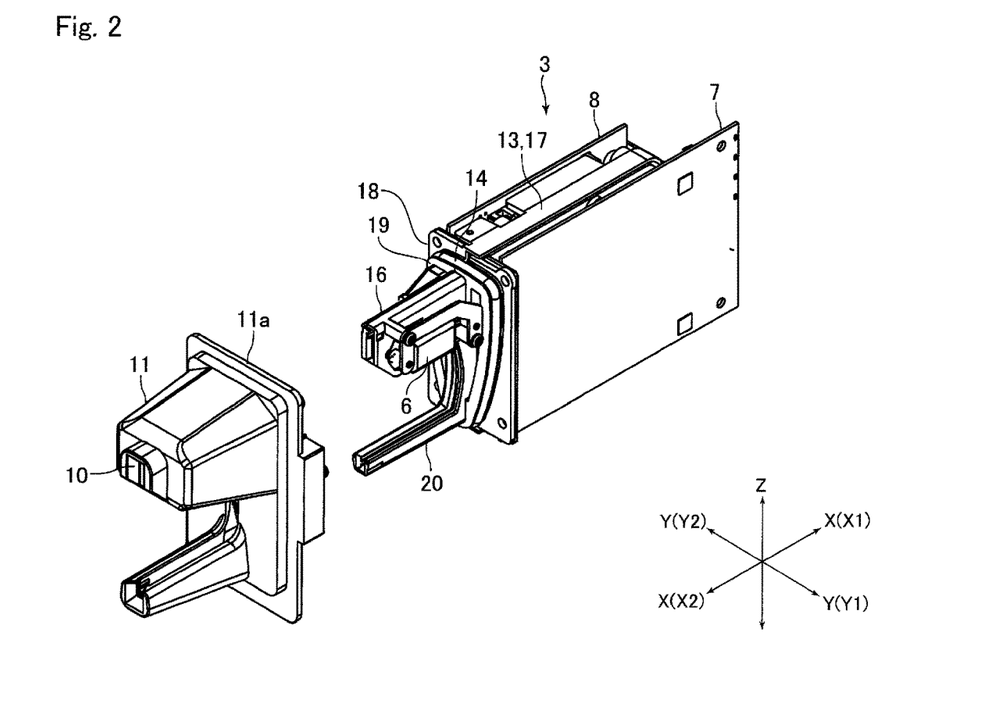
FIG. 2 is an exploded perspective view showing a state that a case body is detached from the card reader shown in FIG. 1.

FIG. 2 is an exploded perspective view showing a state that a case body 4 is detached from the card reader 1 shown in FIG. 1. In FIG. 2, a case main body 12 is not shown.

A card reader 1 in this embodiment is a device in which a card 2 is manually operated by a user and which is structured to perform reading of data recorded in a card 2 and/or recording data to a card 2. Specifically, the card reader 1 is a so-called dip-type card reader structured to perform reading and/or recording of data by manually inserting a card 2 into the card reader 1 and pulling out the card 2 from the card reader 1. The card reader 1 is, for example, mounted and used in a host apparatus such as an oiling apparatus of a gas station in an unattended or self-service system.

The card reader 1 is structured of a card reader main body 3 and a case body 4. The card reader main body 3 includes a magnetic head 6 configured to perform reading of magnetic data recorded in a card 2 and/or recording magnetic data to the card 2, and an IC contact block (not shown) having a plurality of IC contact points for performing data communication with an IC chip incorporated in the card 2. The card reader main body 3 is attached with a printed circuit board 7 with which lead wires (not shown) extended from the magnetic head 6 are connected, and a printed circuit board 8 with which a cable (specifically, flexible printed circuit board) extended from the IC contact block is connected.

The case body 4 is structured of a front face cover 11 formed with an insertion port 10 for a card 2 and a case main body 12. Further, the card reader 1 includes a main body frame 13 which is fixed to the front face cover 11 and is accommodated in the case main body 12, and a sealing member 14 disposed between the front face cover 11 and the main body frame 13. The sealing member 14 is formed of rubber and the like and is formed in a ring shape.

In this embodiment, a card 2 which is manually operated is moved in the "X" direction shown in FIG. 1 and the like. Specifically, a card 2 is inserted in the "X1" direction and the card 2 is pulled out in the "X2" direction. Further, the "Y" direction in FIG. 1 and the like perpendicular to the "X" direction is a thickness direction of a card 2 inserted into the card reader 1, and the "Z" direction in FIG. 1 and the like perpendicular to the "X" direction and the "Y" direction is a width direction of the card 2 (short width direction) inserted into the card reader 1. In the following descriptions, the "X" direction is referred to as a front and rear direction, the "Y" direction is referred to as a right and left direction, and the "Z" direction is referred to as an upper and lower direction. Further, the "X1" direction side is a "rear (back)" side, the "X2" direction side is a "front" side, the "Y1" direction side is a "right" side, and the "Y2" direction side is a "left" side.

A card 2 is, for example, rectangular card made of vinyl chloride whose thickness is about 0.7-0.8 mm. One face of the card 2 is formed with a magnetic stripe in which magnetic data are recorded. Further, the card 2 is incorporated with an IC chip. The other face of the card 2 is formed with an external connection terminal of the IC chip. In accordance with an embodiment of the present invention, a card 2 may be a PET (polyethylene terephthalate) card whose thickness is about 0.18-0.36 mm, or may be a paper card having a predetermined thickness.

The main body frame 13 includes a head arrangement part 16 where the magnetic head 6 is disposed, a card accommodation part 17 in a box shape in which a rear end side of a card 2 inserted through the insertion port 1 is accommodated, a partition part 18 which is formed between the head arrangement part 16 and the card accommodation part 17, a seal arrangement part 19 which is formed between the head arrangement part 16 and the partition part 18 and in which a sealing member 14 is disposed, and a card guide part 20 for guiding the card 2 inserted through the insertion port 10.

Rear ends of the head arrangement part 16 and the card guide part 20 are connected with a front end of the seal arrangement part 19, a rear end of the seal arrangement part 19 is connected with a front end of the partition part 18, and a rear end of the partition part 18 is connected with a front end of the card accommodation part 17. The head arrangement part 16 and the card guide part 20 are formed so as to protrude to a front side from the seal arrangement part 19. Further, the head arrangement part 16 and the card guide part 20 are formed in a state that they are separated from each other with a space therebetween in the upper and lower direction. The IC contact block is attached to the card accommodation part 17. A right side face of the card accommodation part 17 is fixed with the printed circuit board 7, and a left side face of the card accommodation part 17 is fixed with the printed circuit board 8.

The front face cover 11 covers a front side portion of the main body frame 13 with respect to the partition part 18. A flange part 11a formed in a flange shape is formed on a rear face side of the front face cover 11. The flange part 11a is formed in a substantially rectangular frame shape which is long in the upper and lower direction. The case main body 12 is formed in a substantially rectangular parallelepiped box shape whose front end is opened. The case main body 12 is fixed to the front face cover 11 in a state that its front end is abutted with a rear face of the flange part 11a. A rear side portion of the main body frame 13 with respect to the partition part 18 is disposed in the inside of the case main body 12 and the portion of the main body frame 13 on the rear side with respect to the partition part 18 is covered by the case main body 12.

The case main body 12 is structured of a first case body 23 and a second case body 24 which are divided into two pieces in the right and left direction. The first case body 23 structures a right side portion of the case main body 12 and the second case body 24 structures a left side portion of the case main body 12. Further, the first case body 23 is structured of a right side face part 23a which structures a right side face of the case main body 12, upper and lower side faces which structure parts of upper and lower side faces of the case main body 12, and a rear side face part structuring a part of a rear face of the case main body 12. The second case body 24 is structured of a left side face part which structures a left side face of the case main body 12, upper and lower side faces which structure parts of upper and lower side faces of the case main body 12, and a rear side face part structuring a part of the rear face of the case main body 12. In this embodiment, a width in the right and left direction of the first case body 23 is set to be narrower than a width in the right and left direction of the second case body 24.

The first case body 23 covers a part of the card reader main body 3 (specifically, a portion of the card reader main body 3 on a rear side with respect to the partition part 18) and the printed circuit board 7 from the right side. The second case body 24 covers a part of the card reader main body 3 (specifically, a portion of the card reader main body 3 on a rear side with respect to the partition part 18) and the printed circuit board 8 from the left side. In this embodiment, a right side face part 23a of the first case body 23 is a cover member which covers the printed circuit board 7.

The printed circuit boards 7 and 8 are rigid circuit boards and are formed in a substantially rectangular flat plate shape. The printed circuit boards 7 and 8 are fixed to the card reader main body 3 so that their thickness directions are coincided with the right and left direction. In other words, in this embodiment, the right and left direction ("Y" direction) is a thickness direction of the printed circuit board 7. Further, in this embodiment, the right direction ("Y1" direction) is a first direction which is one side of the thickness direction of the printed circuit board 7, and the left direction ("Y2" direction) is a second direction which is the other side of the thickness direction of the printed circuit board 7.

The printed circuit board 7 includes signal pattern layers 34 through 36 (see FIG. 3) which are formed with signal patterns for transmitting a signal of magnetic data (data signal) read from a magnetic stripe of a card 2 by the magnetic head 6, a data signal for being recorded in the magnetic stripe of the card 2 by the magnetic head 6 and the like. The printed circuit board 8 includes signal pattern layers which are formed with signal patterns for transmitting a signal of data (data signal) read from an IC chip of the card 2 by the IC contact points, a data signal for being recorded in the IC chip of the card 2 by the IC contact points, and the like.

In this embodiment, a flexible printed circuit board not shown is stuck to an inner side face of the second case body 24. Specifically, the flexible printed circuit board is stuck to the entire inner side face of the second case body 24 along the inner side face of the second case body 24. The flexible printed circuit board includes a breakage detection pattern layer which is formed with a breakage detection pattern for detecting its own disconnection and its short circuit. Further, as described above, the second case body 24 covers the printed circuit board 8 from the left side.

Therefore, if a criminal tries to access the signal pattern layer of the printed circuit board 8 for illegally acquiring data, the breakage detection pattern of the flexible printed circuit board stuck on the inner side face of the second case body 24 is broken. Therefore, in this embodiment, when breakage of the breakage detection pattern of the flexible printed circuit board is detected, a predetermined processing is executed, for example, data stored in the printed circuit board 8 are erased, or the printed circuit board 8 is set in an unusable state and thereby the printed circuit board 8 can be prevented data from being illegally acquired.

On the other hand, a flexible printed circuit board is not stuck on an inner peripheral face of the first case body 23. In this embodiment, in order to prevent data from being illegally acquired from the printed circuit board 7, the printed circuit board 7 includes, as described below, a breakage detection pattern layer 32 formed with a breakage detection pattern for detecting its own disconnection and its short circuit (see FIG. 3). A specific structure of the printed circuit board 7 will be described below.

(Structure of Printed Circuit Board)

Figure 3:
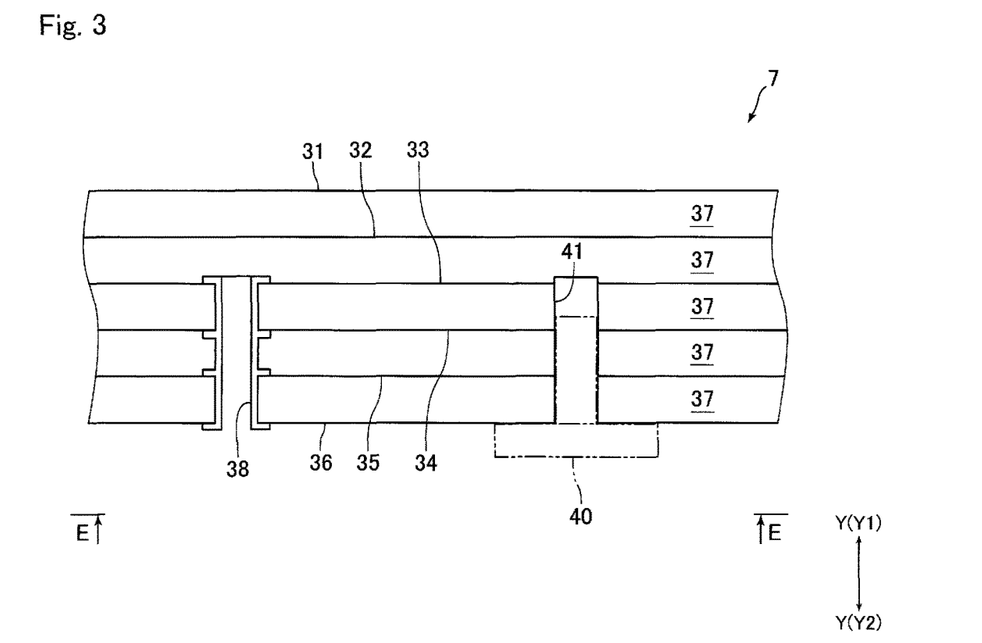
FIG. 3 is an explanatory cross-sectional view showing a part of a cross section of a printed circuit board shown in FIG. 2.
Figure 4:
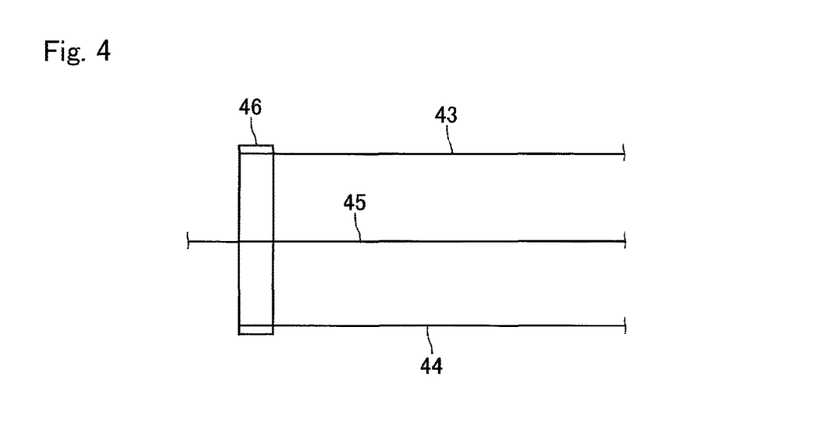
FIG. 4 is an explanatory enlarged view showing a portion of a side face of a printed circuit board from the "E-E" direction in FIG. 3.

FIG. 3 is an explanatory cross-sectional view showing a part of a cross section of the printed circuit board 7 shown in FIG. 2. FIG. 4 is an explanatory enlarged view showing a portion of a left side face of the printed circuit board 7 from the "E-E" direction in FIG. 3.

The printed circuit board 7 is, for example, a six-layer circuit board and provided with a first pattern layer 31 in which a ground pattern and a power supply pattern are formed, a breakage detection pattern layer 32 formed with a breakage detection pattern for detecting its own disconnection and its short circuit, a second pattern layer 33 formed with a ground pattern and a power supply pattern, and three signal pattern layers 34 through 36. The first pattern layer 31, the breakage detection pattern layer 32, the second pattern layer 33 and the signal pattern layers 34 through 36 are disposed in this order from the right side to the left side. In other words, the first pattern layer 31 is disposed on the right side (first direction side) with respect to the breakage detection pattern layer 32, the second pattern layer 33 is disposed on the left side (second direction side) with respect to the breakage detection pattern layer 32, and the signal pattern layers 34 through 36 are disposed on the left side with respect to the second pattern layer 33. Further, the first pattern layer 31 structures a right side face (surface in the first direction) of the printed circuit board 7 and the signal pattern layer 36 structures a left side face (surface in the second direction) of the printed circuit board 7.

As described above, the printed circuit board 7 is fixed to a right side face of the card accommodation part 17 so as to be covered by the first case body 23 from the right side. The right side face of the printed circuit board 7 faces the right side face part 23a side of the first case body 23 (specifically, opposed to the right side face part 23a), and the left side face of the printed circuit board 7 faces the card reader main body 3 side (specifically, opposed to the right side face of the card accommodation part 17). In the printed circuit board 7, a base member 37 formed of insulating material such as glass epoxy is disposed between respective layers. Further, the surface (right side face) of the first pattern layer 31 and the surface (left side face) of the signal pattern layer 36 are covered by an insulating film.

A breakage detection pattern which is formed in the breakage detection pattern layer 32 is, for example, is structured so that two conductor patterns formed in line shapes are wound around in spiral shapes from an outer peripheral side of the printed circuit board 7 toward its inner peripheral side. The breakage detection pattern layer 32 is structured only of the breakage detection pattern. Further, the breakage detection pattern is formed at a position corresponding to the entire circuit portions requiring security of the signal pattern layers 34 through 36. In other words, the breakage detection pattern is formed so as to cover the circuit portions of the signal pattern layers 34 through 36 requiring security from the right side. Further, in this embodiment, a space where security is secured is formed by the breakage detection pattern of the flexible printed circuit board stuck on an inner side face of the second case body 24 and the breakage detection pattern of the printed circuit board 7. In accordance with an embodiment of the present invention, the breakage detection pattern may be formed over the entire region of the breakage detection pattern layer 32 in the front and rear direction and the right and left direction.

The breakage detection pattern is connected with a detection circuit for detecting disconnection of the breakage detection pattern and a short circuit of the breakage detection pattern. Further, the breakage detection pattern is connected with a backup cell through the detection circuit and, when a power supply of the card reader 1 is set in an "OFF" state, electric power is supplied to the breakage detection pattern from the backup cell. Impedance of the breakage detection pattern is set to be high for restraining electric power consumption of the backup cell in an "OFF" state of power supply of the card reader 1. In this embodiment, both of disconnection of the breakage detection pattern and a short circuit of the breakage detection pattern are detected based on a detected result of the detection circuit. However, only one of disconnection of the breakage detection pattern and a short circuit of the breakage detection pattern may be detected based on a detected result of the detection circuit.

A substantially entire first pattern layer 31 is structured of only a ground pattern and a power supply pattern. In other words, in the first pattern layer 31, a ground pattern and a power supply pattern are formed over the substantially entire region of the first pattern layer 31 in the front and rear direction and the right and left direction. In this embodiment, in the first pattern layer 31, an area of the ground pattern is set to be considerably wider than an area of the power supply pattern. The ground pattern and the power supply pattern formed in the first pattern layer 31 cover the breakage detection pattern formed in the breakage detection pattern layer 32 from the right side. Specifically, the ground pattern and the power supply pattern formed in the first pattern layer 31 cover substantially the entire breakage detection pattern from the right side. Further, the first pattern layer 31 (in other words, the right side face of the printed circuit board 7) is mounted with electronic components for power supply. For example, the first pattern layer 31 is mounted with a backup cell which is connected with the breakage detection pattern.

A substantially entire second pattern layer 33 is structured of only a ground pattern and a power supply pattern. In other words, in the second pattern layer 33, a ground pattern and a power supply pattern are formed over a substantially entire region of the second pattern layer 331 in the front and rear direction and the right and left direction. In this embodiment, in the second pattern layer 33, an area of the ground pattern is set to be considerably wider than an area of the power supply pattern. The ground pattern and the power supply pattern formed in the second pattern layer 33 cover the breakage detection pattern formed in the breakage detection pattern layer 32 from the left side. Specifically, the ground pattern and the power supply pattern formed in the second pattern layer 33 cover substantially the entire breakage detection pattern from the left side.

The printed circuit board 7 is formed with some vias 38 for electrically connecting signal patterns with each other between the signal pattern layers 34 through 36 and/or electrically connecting the signal patterns of the signal pattern layers 34 through 36 with the ground pattern or the power supply pattern of the second pattern layer 33. The via 38 is, for example, as shown in FIG. 3, formed from the left side face of the printed circuit board 7 toward the right side so as to penetrate through the signal pattern layers 34 through 36 and the second pattern layer 33. Further, the via 38 is, for example, formed so as to penetrate through the signal pattern layers 35 and 36, formed so as to penetrate through the signal pattern layers 34 and 35, and/or formed so as to penetrate through the signal pattern layer 34 and the second pattern layer 33. Further, the via 38 is, for example, formed so as to penetrate through the signal pattern layers 34 through 36 and/or formed so as to penetrate through the signal pattern layers 34 and 35 and the second pattern layer 33.

Right ends of all the vias 38 formed in the printed circuit board 7 are disposed on the left side with respect to the first pattern layer 31. In this embodiment, the right ends of all vias 38 formed in the printed circuit board 7 are disposed on the left side with respect to the breakage detection pattern layer 32. In other words, all the vias 38 formed in the printed circuit board 7 are not penetrated to the right side face of the printed circuit board 7. In this embodiment, the via 38 which is formed in the printed circuit board 7 and is opened on the left side face of the printed circuit board 7 is closed by an electronic component (not shown) mounted on the left side face of the printed circuit board 7.

The printed circuit board 7 is formed with an arrangement hole 41 in which a part of an electronic component 40 mounted on the left side face of the printed circuit board 7 is disposed. The electronic component 40 is a contact point type switch for detecting that the printed circuit board 7 is fixed to the right side face of the card accommodation part 17 and a boss of the switch is inserted into the arrangement hole 41. The arrangement hole 41 is, for example, as shown in FIG. 3, formed from the left side face of the printed circuit board 7 toward the right side so as to penetrate through the signal pattern layer 36. In other words, the right side end of the arrangement hole 41 is disposed on the left side with respect to the first pattern layer 31. In other words, the arrangement hole 41 is not penetrated to the right side face of the printed circuit board 7.

In this embodiment, a plurality of electronic components 40 is mounted on the printed circuit board 7. In the card reader 1, some electronic components 40 are contacted with the second case body 24 and are, for example, set in "ON" states and some electronic components 40 are contacted with the partition part 18 and are, for example, set in "ON" states. Further, when the second case body 24 is detached or, when the printed circuit board 7 is detached from the right side face of the card accommodation part 17, the electronic component 40 is separated from the second case body 24 or the partition part 18 and is, for example, set in an "OFF" state. Further, when it is detected that the second case body 24 is detached or, alternatively, when it is detected that the printed circuit board 7 is detached from the right side face of the card accommodation part 17, predetermined processing is executed, for example, data stored in the printed circuit board 7 are erased or the printed circuit board 7 is made in an unusable state.

The signal pattern layer 36 is, for example, as shown in FIG. 4, formed with a first signal pattern 43, a second signal pattern 44 and a third signal pattern 45 as a signal pattern. The third signal pattern 45 is formed so as to pass between the first signal pattern 43 and the second signal pattern 44 and is insulated from the first signal pattern 43 and the second signal pattern 44. The first signal pattern 43 and the second signal pattern 44 are electrically connected through a resistor 46 which is mounted on the left side face of the printed circuit board 7.

(Principal Effects in this Embodiment)

As described above, in the printed circuit board 7 in this embodiment, the first pattern layer 31, the breakage detection pattern layer 32, the second pattern layer 33 and the signal pattern layers 34 through 36 are disposed from the right side toward the left side in this order. Further, in this embodiment, the printed circuit board 7 is attached to the card reader main body 3 so that the right side face of the printed circuit board 7 faces the right side face part 23a side of the first case body 23, and the left side face of the printed circuit board 7 faces the card reader main body 3 side. Therefore, in this embodiment, in a state that the printed circuit board 7 is attached to the card reader main body 3, when the signal pattern layers 34 through 36 are tried to be accessed for illegally acquiring data (magnetic data) read from a card 2 and/or data for recording to the card 2, the breakage detection pattern of the breakage detection pattern layer 32 is broken. Further, in this embodiment, the breakage detection pattern is connected with the detection circuit and thus, when the breakage detection pattern is disconnected or short-circuited due to breakage of the breakage detection pattern, the breakage of the breakage detection pattern is detected by the detection circuit. Therefore, according to this embodiment, when breakage of the breakage detection pattern is detected, predetermined processing can be executed, for example, data stored in the printed circuit board 7 are erased or the printed circuit board 7 is made in an unusable state. As a result, data requiring security are prevented from being illegally acquired from the printed circuit board 7.

In this embodiment, a substantially entire breakage detection pattern formed in the breakage detection pattern layer 32 is covered by a ground pattern and a power supply pattern formed in the first pattern layer 31 from the right side, and is covered by a ground pattern and a power supply pattern formed in the second pattern layer 33 from the left side. Therefore, according to this embodiment, even when impedance of the breakage detection pattern is high, the breakage detection pattern is hard to be affected due to noise from the outside. Accordingly, in this embodiment, erroneous detection of disconnection and a short circuit of the breakage detection pattern can be prevented.

In this embodiment, all the vias 38 and the arrangement holes 41 formed in the printed circuit board 7 do not reach to the right side face of the printed circuit board 7. Therefore, according to this embodiment, even when the vias 38 and the arrangement holes 41 penetrating through the signal pattern layers 34 through 36 are formed in the printed circuit board 7, in a state that the printed circuit board 7 is attached to the card reader main body 3, the vias 38 and the arrangement holes 41 are unable to be directly accessed. Accordingly, in this embodiment, data requiring security are effectively prevented from being illegally acquired from the printed circuit board 7.

In this embodiment, even when the third signal pattern 45 is formed so as to pass between the first signal pattern 43 and the second signal pattern 44, the first signal pattern 43 and the second signal pattern 44 are electrically connected with each other through the resistor 46 which is mounted on the left side face of the printed circuit board 7. Therefore, according to this embodiment, the number of the vias 38 formed in the printed circuit board 7 can be reduced. Accordingly, in this embodiment, data requiring security are effectively prevented from being illegally acquired from the printed circuit board 7.

Other Embodiments

Although the present invention has been shown and described with reference to a specific embodiment, various changes and modifications will be apparent to those skilled in the art from the teachings herein.

In the embodiment described above, a substantially entire first pattern layer 31 is structured of only a ground pattern and a power supply pattern. However, the present invention is not limited to this embodiment. For example, a substantially entire first pattern layer 31 may be structured of only a ground pattern. In other words, the first pattern layer 31 may be formed of a ground solid layer comprised of only a ground pattern. In this case, the printed circuit board 7 may be, for example, provided with a power supply pattern layer which is disposed between the first pattern layer 31 and the breakage detection pattern layer 32.

Similarly, in the embodiment described above, the substantially entire second pattern layer 33 is structured of only a ground pattern and a power supply pattern but the substantially entire second pattern layer 33 may be structured of only a ground pattern. In other words, the second pattern layer 33 may be formed of a ground solid layer comprised of only a ground pattern. In this case, the printed circuit board 7 is, for example, provided with a power supply pattern layer formed with a power supply pattern on the left side with respect to the breakage detection pattern layer 32.

In the embodiment described above, the printed circuit board 7 is provided with three signal pattern layers 34 through 36. However, the present invention is not limited to this embodiment. For example, the signal pattern layer provided in the printed circuit board 7 may be one or two layers, or may be four layers or more. Further, in the embodiment described above, one arrangement hole 41 is formed in the printed circuit board 7 but two or more arrangement holes 41 may be formed in the printed circuit board 7. Further, in the embodiment described above, the printed circuit board 7 is a rigid circuit board formed in a plate shape. However, the printed circuit board 7 may be a flexible printed circuit board which is formed in a film shape.

In the embodiment described above, all the vias 38 formed in the printed circuit board 7 do not reach to the right side face of the printed circuit board 7. However, a via 38 reaching to the right side face of the printed circuit board 7 may be formed in the printed circuit board 7. Further, in the embodiment described above, the arrangement hole 41 does not reach to the right side face of the printed circuit board 7. However, the arrangement hole 41 may be formed so as to reach to the right side face of the printed circuit board 7. Further, in the embodiment described above, the first signal pattern 43 and the second signal pattern 44 are electrically connected with each other through the resistor 46. However, the first signal pattern 43 and the second signal pattern 44 may be electrically connected with each other through a via.

In the embodiment described above, the card reader 1 is a manual type card reader but the card reader 1 may be a card conveyance type card reader including a card conveying mechanism structured to automatically convey a card 2. Further, in the embodiment described above, the printed circuit board 7 is attached to the card reader main body 3 of the card reader 1. However, the printed circuit board 7 may be attached to an apparatus other than the card reader main body 3.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A printed circuit board which is formed in a plate shape or a film shape, the printed circuit board comprising:
    a breakage detection pattern layer comprising a breakage detection pattern configured to detect disconnection of the breakage detection pattern and/or a short circuit of the breakage detection pattern;
    a first pattern layer which is disposed on a first direction side with respect to the breakage detection pattern layer;
    a second pattern layer which is disposed on a second direction side with respect to the breakage detection pattern layer; and
    a signal pattern layer which is disposed on the second direction side with respect to the second pattern layer;

wherein the first direction side is toward a first side of the printed circuit board in a thickness direction of the printed circuit board, and the second direction side is toward a second side of the printed circuit board in the thickness direction of the printed circuit board and opposite to the first direction side;

wherein the first pattern layer comprises a ground pattern which covers the breakage detection pattern from the first direction side, or the first pattern layer comprises a ground pattern and a power supply pattern which cover the breakage detection pattern from the first direction side; and wherein the second pattern layer comprises a ground pattern which covers the breakage detection pattern from the second direction side, or the second pattern layer comprises a ground pattern and a power supply pattern which cover the breakage detection pattern from the second direction side;

the printed circuit board comprises vias which penetrate through at least the signal pattern layer, the first pattern layer structures a surface on the first direction side of the printed circuit board, and first direction ends of all the vias are disposed on the second direction side with respect to the first pattern layer.

2. The printed circuit board according to claim 1, wherein the printed circuit board comprises arrangement holes in which a part of an electronic component mounted on a surface on the second direction side of the printed circuit board is disposed so as to penetrate through at least the signal pattern layer, and first direction ends of all the arrangement holes are disposed on the second direction side with respect to the first pattern layer.

3. The printed circuit board according to claim 2, wherein the signal pattern layer structures a surface on the second direction side of the printed circuit board, the signal pattern layer comprises a first signal pattern, a second signal pattern and a third signal pattern, the third signal pattern is formed so as to pass through between the first signal pattern and the second signal pattern and is insulated from the first signal pattern and the second signal pattern, and the first signal pattern and the second signal pattern are electrically connected with each other through a resistor mounted on a surface on the second direction side of the printed circuit board.

4. The printed circuit board according to claim 1, wherein the signal pattern layer structures a surface on the second direction side of the printed circuit board, the signal pattern layer comprises a first signal pattern, a second signal pattern and a third signal pattern, the third signal pattern is formed so as to pass through between the first signal pattern and the second signal pattern and is insulated from the first signal pattern and the second signal pattern, and the first signal pattern and the second signal pattern are electrically connected with each other through a resistor mounted on a surface on the second direction side of the printed circuit board.

5. A card reader comprising:

a printed circuit board which is formed in a plate shape or a film shape;

a card reader main body to which the printed circuit board is attached; and a cover member which covers the printed circuit board;

wherein when one side in a thickness direction of the printed circuit board is referred to as a first direction, and the other side in the thickness direction of the printed circuit board is referred to as a second direction, the printed circuit board comprising:

a breakage detection pattern layer comprising a breakage detection pattern configured to detect disconnection of the breakage detection pattern and/or a short circuit of the breakage detection pattern;

a first pattern layer which is disposed on a first direction side with respect to the breakage detection pattern layer;

a second pattern layer which is disposed on a second direction side with respect to the breakage detection pattern layer; and a signal pattern layer which is disposed on the second direction side with respect to the second pattern layer;

wherein the first pattern layer comprises a ground pattern which covers the breakage detection pattern from the first direction side, or the first pattern layer comprises a ground pattern and a power supply pattern which cover the breakage detection pattern from the first direction side; and wherein the second pattern layer comprises a ground pattern which covers the breakage detection pattern from the second direction side, or the second pattern layer comprises a ground pattern and a power supply pattern which cover the breakage detection pattern from the second direction side;

wherein the signal pattern layer comprises a signal pattern for transmitting a data signal which is read from a card in the card reader main body and/or a data signal which is recorded to a card in the card reader main body; and wherein the printed circuit board is attached to the card reader main body so that a surface on the first direction side of the printed circuit board faces a cover member side and that a surface on the second direction side of the printed circuit board faces a card reader main body side;

the printed circuit board comprises vias which are penetrated through at least the signal pattern layer, the first pattern layer structures a surface on the first direction side of the printed circuit board, and first direction ends of all the vias are disposed on the second direction side with respect to the first pattern layer.

6. The card reader according to claim 5, wherein the printed circuit board comprises arrangement holes in which a part of an electronic component mounted on a surface on the second direction side of the printed circuit board is disposed so as to penetrate through at least the signal pattern layer, and first direction ends of all the arrangement holes are disposed on the second direction side with respect to the first pattern layer.

7. The card reader according to claim 6, wherein the signal pattern layer structures a surface on the second direction side of the printed circuit board, the signal pattern layer comprises a first signal pattern, a second signal pattern and a third signal pattern, the third signal pattern is formed so as to pass through between the first signal pattern and the second signal pattern and is insulated from the first signal pattern and the second signal pattern, and the first signal pattern and the second signal pattern are electrically connected with each other through a resistor mounted on a surface on the second direction side of the printed circuit board.

8. The card reader according to claim 5, wherein
the signal pattern layer structures a surface on the second direction side of the printed circuit board,
the signal pattern layer comprises a first signal pattern, a second signal pattern and a third signal pattern,
the third signal pattern is formed so as to pass through between the first signal pattern and the second signal pattern and is insulated from the first signal pattern and the second signal pattern, and the first signal pattern and the second signal pattern are electrically connected with each other through a resistor mounted on a surface on the second direction side of the printed circuit board.

* * * * *